G. B. BURNSIDE.
METHOD OF HERMETICALLY SEALING ELECTRICAL CONDUCTORS THROUGH OR INTO HARD VITREOUS SUBSTANCES.
APPLICATION FILED APR. 29, 1911.
1,016,320. Patented Feb. 6, 1912.
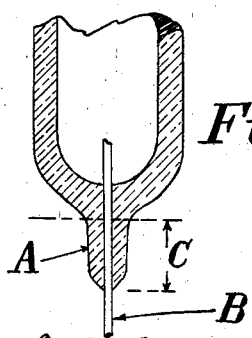
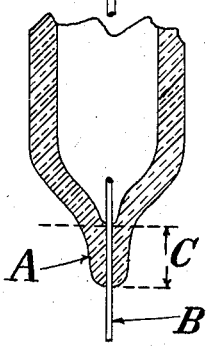
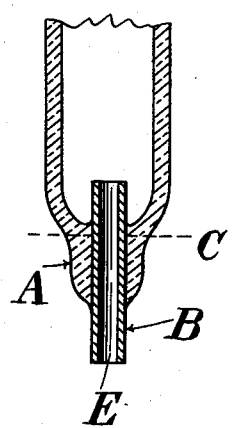
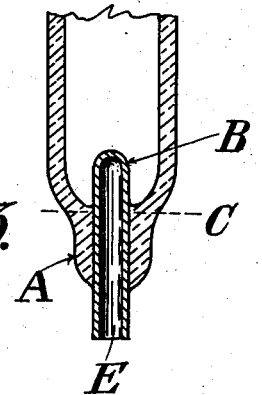
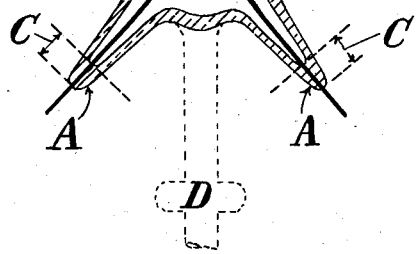

UNITED STATES PATENT OFFICE.

GEORGE BARNHILL BURNSIDE, OF RENFREW, SCOTLAND.

METHOD OF HERMETICALLY SEALING ELECTRICAL CONDUCTORS THROUGH OR INTO HARD VITREOUS SUBSTANCES.

1,016,320.　　　　Specification of Letters Patent.　　Patented Feb. 6, 1912.

Application filed April 29, 1911. Serial No. 624,234.

*To all whom it may concern:*

Be it known that I, GEORGE BARNHILL BURNSIDE, a subject of the King of Great Britain, residing at Renfrew, Scotland, have invented a certain new and useful Improved Method of Hermetically Sealing Electrical Conductors Through or into Hard Vitreous Substances, of which the following is a specification.

This invention relates to an improved method of hermetically sealing wires, or other electrical conductors, through or into lead glass, Jena glass, quartz glass or other vitreous substance.

Hitherto in connection with the manufacture of incandescent electric lamps, mercury or other vapor apparatus and other kinds of vacuum tubes, it has been the custom to employ flux glass around the conductors of copper or short pieces of platinum wire, or wires of special shape in some cases flattened and in other cases having enlarged portions, advantage being taken of the contraction and expansion of the wire. Solutions of india-rubber and copal cement have also been employed or the conductors have been electro plated or tinned and coated with flux glass or alloys have been used. In all these cases the difficulty caused by the difference between the thermal expansions of the glass and the electrical conductor has to be guarded against.

My invention consists in first heating the vitreous substance which surrounds the electrical conductor and with it forms the seal, until perfect cohesion has been effected between the vitreous substance and the conductor, and then allowing the vitreous subtance to col to about a dull red heat, whereafter the seal is suddenly cooled or put through a process of hardening, the vitreous substance being thus fixed around the electrical conductor. It is desirable to allow such a quantity of vitreous substance around the electrical conductor as is consistent with mechanical strength. By employing this method a gas pressure tight joint or hermetic seal can be made between the wire, or other electrical conductor and the vitreous substance, without any difficulty arising from the difference in their co-efficients of thermal expansion; the seal will remain gas-pressure tight under all the temperature conditions experienced during or after the actual working of the electric lamp or tube.

In order that the invention may be clearly understood I will now describe, by way of example, the application of the invention in connection with the sealing of electrical conductors through the vitreous substance of incandescent electric lamps, vapor electric apparatus or other forms of vacuum tubes.

The electrical conductor is placed through or into an aperture or passage in the vitreous substance. This aperture should be just large enough to admit the conductor so that oxidation may be prevented as far as possible, when the conductor is heated. The vitreous substance surrounding the electrical conductor is then strongly heated by means of a small blow pipe flame until perfect cohesion has been attained between the vitreous substance and the electrical conductor. The seal is then taken out of the flame and when at about a dull red heat, is cooled by several immersions in a suitable medium such as sperm oil or such like; it is advisable that the cooling medium should be previously warmed slightly. Each immersion may last about three seconds with intervals of three seconds between. The seal or joint is immersed a little farther in the cooling medium at each successive immersion until the seal is completely cooled and hardened. This cooling or hardening process lasts about thirty seconds. In practice it has been found very convenient to fix the vitreous substance in its state of cohesion around the electrical conductor by bringing a small vessel of oil up around the seal or joint and applying it in the manner above described.

The electrical conductor should be perfectly clean and smooth and it may, if desired, be coated to prevent the oxidation, before it is sealed through or into the vitreous substance.

If the conductor is required to carry an electrical current of not more than about fifteen amperes it is convenient to have the conductor in the form of a solid wire of circular cross section. If the current to be carried by the electrical conductor exceeds fifteen amperes the conductor may very conveniently be tubular, preferably of circular cross section and which is subsequently closed or plugged with an electrically conducting substance. The tubular form of conductor is used in this case because it can be more effectively cooled throughout by the cooling medium both outside and inside it than would be the case with a solid conductor of the same area of cross section.

Referring to the accompanying drawings:—Figure 1 shows a seal for Jena glass combustion tubing. Fig. 2 shows a seal A for lead or German glass. Fig. 3 is an enlarged view showing the seals A, A, suitable for incandescent lamps. Figs. 4 and 5 show seals A, A, for a tubular electrical conductor B suitable in cases where a large electrical current is required. In Fig. 5 the electrical conductor B is shown closed at one end. This form is especially useful when applied to the case of mercury vapor lamps or rectifiers the tubular shell being made of a substance which does not form an amalgam and thus forming a protecting cover to a highly conducting material such as copper, which is acted on by mercury. The electrical conductor B is sealed in the seal A which latter is cooled and thereby hardened in the cooling medium by gradually increasing immersions until the part indicated by the dotted line, at C, is reached.

Figs. 1 and 2, show suitable proportions for the conductor B and the seal A for combustion tubing and the like, while Fig. 3 shows a convenient arrangement for adapting the seal to the central stem of an incandescent electric lamp.

D represents an extension to suit metallic filament electric lamps.

E is the plug of conducting material for the tubular form of conductor.

A very effective seal can be obtained by the herein described method between a solid copper wire conductor up to 1.23 millimeters in diameter and German glass. Platinum wires, varying in thickness up to 1 millimeter have been successfully sealed in Jena glass and other vitreous substances. I have also sealed thicker wires very effectively. In the case of tubular conductors there is practically no limit to the magnitude of the cross-sectional area of the conductors.

Having now fully described my invention what I claim and desire to secure by Letters Patent is:—

1. A method of hermetically sealing electrical conductors through or into vitreous substances which consists in first heating the vitreous substance, which surrounds the electrical conductor and with it forms the seal, until perfect cohesion has been effected between the vitreous substance and the conductor and then allowing the vitreous substance to cool to about a dull red heat whereafter the seal is suddenly cooled or put through a process of hardening, the vitreous substance being thus fixed around the electrical conductor.

2. A method of hermetically sealing electrical conductors through or into vitreous substances which consists in first heating the vitreous substance, which surrounds the electrical conductor and with it forms the seal, until perfect cohesion has been effected between the vitreous substance and the conductor and then allowing the vitreous substance to cool to about a dull red heat, whereafter the seal is suddenly cooled or put through a process of hardening by immersing it into an oleaginous substance the vitreous substance being thus fixed around the electrical conductor.

In testimony whereof I affix my signature in presence of two witnesses.

GEORGE BARNHILL BURNSIDE.

Witnesses:
WILLIAM CARRUTHERS,
H. D. FITZPATRICK.